United States Patent
Nagelsdiek et al.

(10) Patent No.: US 8,778,458 B2
(45) Date of Patent: Jul. 15, 2014

(54) ADHESION PROMOTER FOR COATINGS ON DIFFERENT SUBSTRATE SURFACES

(75) Inventors: René Nagelsdiek, Hamminkeln (DE); Bernd Gobelt, Wesel (DE); Jürgen Omeis, Dorsten-Lembeck (DE); Andreas Freytag, Nottuln (DE); Dorothée Greefrath, Mülheim an der Ruhr (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 13/371,925

(22) Filed: Feb. 13, 2012

(65) Prior Publication Data

US 2012/0183787 A1    Jul. 19, 2012

Related U.S. Application Data

(63) Continuation of application No. PCT/EP2010/005311, filed on Aug. 30, 2010.

(30) Foreign Application Priority Data

Aug. 31, 2009 (EP) .................................. 09011137

(51) Int. Cl.
   *B05D 1/36* (2006.01)
(52) U.S. Cl.
   USPC .................................................. 427/402
(58) Field of Classification Search
   CPC ................................ B05D 5/10; C08L 51/085
   USPC ........................................................ 427/402
   See application file for complete search history.

(56) References Cited

U.S. PATENT DOCUMENTS

| 4,889,768 | A | | 12/1989 | Yokoshima et al. |
| 5,173,523 | A | * | 12/1992 | Auchter et al. ............... 524/461 |
| 5,227,043 | A | * | 7/1993 | Shakushiro et al. .......... 204/421 |
| 2008/0005988 | A1 | * | 1/2008 | Dombowsky ................... 52/314 |
| 2009/0111912 | A1 | | 4/2009 | Chasser et al. |
| 2010/0016492 | A1 | | 1/2010 | Nagelsdiek et al. |

FOREIGN PATENT DOCUMENTS

| DE | 10 2005 046641 A1 | 4/2007 |
| EP | 0 274 112 A2 | 7/1988 |
| EP | 0 480 363 A2 | 4/1992 |
| EP | 1 157 146 | 11/2001 |

(Continued)

OTHER PUBLICATIONS

International Search Report Dated Jan. 2, 2011, Mailed Jan. 14, 2011.

(Continued)

*Primary Examiner* — Michael Cleveland
*Assistant Examiner* — James M Mellott
(74) *Attorney, Agent, or Firm* — Norris McLaughlin & Marcus PA (57) ABSTRACT

A method of promoting the adhesion between a coating based on at least one polymer and a substrate surface that can be made of different materials in which an adhesion promoter comprising at least one, optionally oligomeric, addition product having no terminal C=C double bonds and has hydrolyzable silane groups and other functional groups is included in the coating composition, included in a preliminary coating applied to the substrate surface prior to the actual coating, is applied between the coating and substrate surface, or any combination thereof.

13 Claims, 2 Drawing Sheets

(56) References Cited

FOREIGN PATENT DOCUMENTS

| | | |
|---|---|---|
| JP | 9 291135 | 11/1997 |
| JP | 9291135 A * | 11/1997 |
| WO | 03/082958 | 10/2003 |
| WO | 2008/003190 | 1/2008 |
| WO | 2008/003191 | 1/2008 |
| WO | 2008/031895 | 3/2008 |
| WO | 2008/077045 | 6/2008 |
| WO | 2008-104378 A1 | 9/2008 |
| WO | WO 2008104378 A1 * | 9/2008 |
| WO | 2009/064282 | 5/2009 |

OTHER PUBLICATIONS

European Search Report Dated Jan. 22, 2010.
Rafi, et al. "The Effect of Epoxy-Silane as an Adhesion Promoter on Adhesion of Epoxy Coating on Aluminum Substrate", Polymer Engineering Dept., pp. 173-175, The Adhesion Society, 2005.
Brock-Groteklaes-Mischke_Lehrbuch der Lacktechnologie, Table of Contents (2002).
Elias, "Polymere Von Monomeren and Makromolekülen Zu Werkstoffen", Huethig & Wept, 1996 (Cover page).
Ramrus et al., "Using Heterogeneous Silane Patterns to Maintain Adhesion and Decrease Water Penetration into Epoxy/aluminum Interfaces", J. Adhesion Sci. Technol., vol. 20, pp. 1615-1623, 2006.
Walker, "Organosilanes as Adhesion Promoters for Organic Coatings. Part 1: Silanes on the Metal Surface", J. Oil Col. Chem. Assoc., vol. 65, pp. 415-423, 1982.
Meuthen et al., "Coil Coating", Vieweg, Advanced Photonics, 2005.
Sathyanarayana et al., "Role of Promoters in Improving Adhesion of Organic Coatings to a Substrate", Progress in Organic Coatings, vol. 26, pp. 275-313, 1995.
Khayankarn et al., "Organosilane as Promoters for Thermal and UV Cured Epoxies: Adhesive Strength on Glass Surfaces after Hygrothermal Aging", Polymer Science and Engineering, pp. 486-488, The Adhesion Society, 2005.
Mohseni et al., "Adhesion Performance of an Epoxy Clear Coat on Aluminum Alloy in the Presence of Vinyl and Amino-Silane Primers", Prog. Organic Coatings, vol. 57, pp. 307-313, 2006.
Stoye Freitag, "Chemie Eigenschaften Anwendung", Hanser, 1996. (Cover page).
UPPC, "Polypox Glycidether", Übersicht Lieferprogramm, Apr. 2005.
Technical Information, "Surface Protection I", vol. 1, Nov. 1994.
Technical Information, "Surface Protection II", vol. 2, Apr. 1996.
Turner, "Canmaking the Technology of Metal Protection and Decoration", Published by Blackie Academic & Professional, 1998. (Cover page).
Deflorian et al., "Silane Pre-treatments of Copper and Aluminium", Electrochimica Acta, vol. 51, pp. 6097-6103, 2006.

* cited by examiner

ADHESION PROMOTER FOR COATINGS ON DIFFERENT SUBSTRATE SURFACES

This application is a Continuation of PCT/EP2010/005311 filed Aug. 30, 2010, which claims priority to European application 09 011 137.8 filed 31 Aug. 2009.

The present invention relates to the use of at least one optionally oligomeric addition product containing no terminal C=C double bonds but having hydrolyzable silane groups and other functional groups, preferably amino groups, as adhesion promoter between a coating based on at least one polymer and a substrate surface, which may consist of different materials, and also to objects or articles coated accordingly.

BACKGROUND OF THE INVENTION

Coatings on substrates may serve various purposes, ranging from decorative purposes through to protection from harmful effects on the coated substrate. In order to be able to exert each of these functions, it is vital that the coating adheres to the coated substrate surface sufficiently well, such that there is no unwanted delamination between the coating and the coated surface.

Coatings are notably in layer form or film form depending on their thickness, with in each case only one surface of the coating being joined to the surface of the substrate to be coated. This of course is not to rule out the possibility of this arrangement of the substrate with coating being repeated ad infinitum, which may lead, for example, to a substrate/coating/substrate laminate or substrate/coating/substrate/coating laminate. A further characteristic of coatings is that they generally have a largely homogeneous film thickness, of the kind usual for surface-coating films or coats. Another characteristic of such coatings is that the material to be coated is not mixed or intermingled in any way with the coating material, and so the layer-form or film-form coating is in contact only by one of its sheetlike surfaces with the surface of the coated material. Sheetlike surfaces are to be understood hereinafter not only as level surfaces, but also as uneven surfaces, such as, for example, bent, domed, waved, creased or otherwise nonuniformly designed surfaces. Thus, for example, the surface of a wire is also a sheetlike surface of a body in the sense of the invention.

On account of the physical and chemical properties, coatings are often produced using plastics, in order to be able to provide laminates comprising the coated substrate and the coating having the desired properties. One possible example of a composite of this kind is a metal body with sheetlike extent whose surface is coated with a polyurethane. Where the coating has a relatively low film thickness, it is referred to preferably as a surface-coating film, which is based customarily on a physically and/or chemically cured surface-coating system as coating material. The coating material may optionally also be present in a modified form, such as in filled or foamed form, for example.

Vital to all forms of coatings, i.e., to layer-form coating and to film-form surface-coatings, is the existence, between the coated surface and the adjoining surface of the coating or film, of a sufficient adhesion, which is lasting and which ensures the desired purpose, as for example a decoration and/or a protection against different, preferably harmful effects.

An overview of various classes of substance used for promoting adhesion is given in Progress in Organic Coatings 1995, 26, 275. From this it is evident that, generally, adhesion-promoting substances are used in different ways: such as (i) either as a pretreatment layer, in which case the adhesion-promoting substance is first deposited on the substrate surface and only then is the intended coating applied; or (ii) as an additive directly in the intended coating, with the advantageous consequence of a reduction by one workstep relative to method (i).

According to the prior art, one class of substance which is widely used and is added to coatings for the purpose of promoting the adhesion is the class of the low molecular mass, organofunctional alkoxysilanes.

The use of organosilanes as direct pretreatment on the metal surface to be coated is described in, for example, J. Oil Colour Chem. Assoc. 1982, 65, page 415, and the use of organosilanes as additive in the coating material is described in the same publication on page 436. Furthermore, for example, the pretreatment of copper or aluminum with silanes is described in Electro-chimica Acta 2006, 51, 6097.

J. Adhesion Sci. Technol. 2006, 20, 1615 describes improved adhesion of an epoxy varnish on an aluminum substrate surface through use of a combination of glycidyloxypropyltrimethoxysilane and a further hydrophobic silane.

Prog. Organic Coatings 2006, 57, 307 describes the influence of vinyl- and aminosilanes on the adhesion between epoxy clearcoats and aluminum surfaces.

According to Proceedings: 28$^{th}$ Annual Meeting of the Adhesion Society, Feb. 13-16, 2005, page 173 ff. and also 486 ff., the use of epoxy-functional organosilanes improves adhesion of epoxy varnishes on aluminum substrate surfaces and of epoxy varnishes on glass substrates, respectively.

EP 1157146 describes the pretreatment of a metal surface with specific bis-silyl-silanes, enhancing the adhesion of rubber to this substrate.

WO 2008/003190 describes the use of addition products of thioalkoxysilanes with polyfunctional (meth)acrylates as adhesion promoters for radiation-curable systems. Since these known addition products still have free terminal (meth)acrylate groups, they may be incorporated as well by radical crosslinking in the course of a radiation cure, and this may lead to unwanted secondary reactions. Moreover, on storage, for example, the polymerization tendency of the double bonds in these products may cause them to undergo partial or complete polymerization, thereby possibly leading to loss of or adverse effect on their functionality when they are employed. A further factor is that adhesion promoters with double bonds as functional groups are limited to employment in radically curing (radiation-curing) binder/polymer systems. Adhesion promoters with universal applicability, i.e., adhesion promoters for different binder/polymer systems, however, are a requirement of the users.

This requirement is also not met by the reaction products of hydroxy-functional (meth)acrylates with isocyanate-functional alkoxysilanes, described in U.S. Pat. No. 4,889,768, which are employed in conjunction with glass fibers, since the addition products likewise still have terminal (meth)acrylate groups.

Furthermore, WO 2008/003191 describes the use of (1) addition products of isocyanatosilanes with OH- or NH-functional (meth)acrylates, or of (2) addition products of diisocyanates with OH- or NH-functional (meth)acrylates, and the subsequent reaction thereof with thio- or aminosilanes, with these adhesion promoters as well still containing free terminal (meth)acrylate groups which may be incorporated by crosslinking as well, radically, in the course of the radiation cure when they are employed for radiation-curable systems.

WO 2009/064282 describes addition products of aminosilanes with preferably low molecular mass (meth)acrylates as adhesion promoters for polyurea coatings on substrates; their adhesion does not meet all of the requirements.

It was an object of the present invention, therefore, to avoid the disadvantages of the prior art and to achieve excellent adhesion between coatings, preferably surface-coating films, based on any of a very wide variety of polymers, and substrate surfaces composed of a multiplicity of materials.

SUMMARY OF THE INVENTION

In accordance with the invention this is achieved through use of specific addition products with hydrolyzable silane groups and further functional groups.

The present invention accordingly provides a use of a.) at least one optionally oligomeric addition product containing no terminal C═C double bonds
  of at least one aminosilane and/or thiosilane containing at least one hydrolyzable silane group and at least one further monoamine and/or polyamine having at least two amino groups
  with at least one compound containing at least two terminal, ethylenically unsaturated double bonds and/or of b.) at least one optionally oligomeric addition product containing no terminal C═C double bonds
  of at least one isocyanatosilane and/or epoxy silane containing at least one hydrolyzable silane group
  with at least one compound containing at least one terminal hydroxyl group and at least one terminal, ethylenically unsaturated double bond, in combination with at least one monoamine and/or polyamine having at least two amino groups as adhesion promoter(s) between a coating based on at least one synthetic, semisynthetic and/or natural polymer and a substrate surface coated therewith.

DETAILED DESCRIPTION

By coating is meant, depending on layer thickness, a layerform or film-form coating, having in each case a largely homogeneous layer thickness, or a film, only one surface of which has a common interface as sole contact face with the coated substrate surface. Preferably there are no fractions of the coated substrate in any form of distribution, more particularly not polydispersely or individually formed and optionally loosely associated such as in the form of woven fabrics, laid scrims or fiber bundles, present in the coating, and so the sole contact face between coating and coated substrate is the respective, optionally pretreated substrate surface and a coating surface. This of course does not rule out the possibility of this arrangement of substrate and coating being repeated ad infinitum, and leading, for example, to a substrate/coating/substrate laminate, in accordance with a sandwich arrangement, or to a substrate/coating/substrate/coating laminate.

Excluded from the subject matter of the invention, therefore, preferably, are more particularly cured polymer mixtures, preferably polymer concrete mixtures, which are based on an at least oligomeric addition product a) and/or b), on a binder system intended for curing and based on at least one polymer containing at least two epoxide end groups, at least one curing component, and optionally an accelerator, and at least 20% by weight, based on the total weight of the polymer mixture, of inorganic, optionally multiparticulate fillers as aggregates, and optionally customary auxiliaries.

Through the use of the above-recited addition products a) and b), respectively, as adhesion promoters, in the production of coatings, success is achieved, surprisingly, in improving significantly the adhesion between coatings based on synthetic, semisynthetic and/or natural polymers and substrate surfaces consisting of any of a very wide variety of materials, and hence of critically preventing damaging effects, such as corrosion, for example. The coating of the substrate may take place preferably by all of the application methods that are known from the prior art, such as, for example, spreading, spraying, injecting, rolling, knifecoating, dipping.

The adhesion promoters employed in accordance with the invention are optionally oligomeric addition products containing no terminal C═C double bonds; in the case of the addition product a) they derive from at least one aminosilane and/or thiosilane containing at least one hydrolyzable silane group and from at least one monoamine and/or polyamine having at least two amino groups, by respective addition with at least one compound containing at least two terminal ethylenically unsaturated double bonds, and in the case of the addition product b) they derive by addition of at least one isocyanatosilane or epoxy silane comprising at least one hydrolyzable silane group with at least one compound containing at least one terminal hydroxyl group and at least one terminal, ethylenically unsaturated double bond, in combination with at least one monoamine and/or polyamine having at least two amino groups.

As compounds containing at least one hydrolyzable silane group, for preparing the addition product a) and/or b), it is preferred to use compounds of the general formula below in which A is an epoxide group, a glycidyloxy group, an isocyanate group, an —SH group or a group —N(H)—X, where X is hydrogen, an optionally branched alkyl radical having 1 to 12 C atoms, an aryl radical having 6 to 10 C atoms or a cycloalkyl radical having 4 to 6 C atoms and each of these X radicals may be substituted by one or more primary or secondary amino group, or A is an —NH group if m is an integer 2, $R_0$ is an optionally branched alkylene radical having 1 to 12 C atoms, a cycloalkylene radical having 4 to 6 C atoms or an arylene radical having 6 to 10 C atoms, $R_1$, identical to or different from $R_2$ and $R_3$, is an optionally branched alkyl radical having 1 to 7 C atoms, preferably 1 to 3 C atoms, a halogen, a group —O—C(═O)—$R_4$ or a group —O$R_4$, where $R_4$, identical or different, is hydrogen, a methoxyethyl group or an optionally branched alkyl radical having 1 to 7 C atoms, preferably 1 to 3 C atoms, or a cycloalkyl radical having 4 to 6 C atoms, $R_2$, identical to or different from $R_1$ and $R_3$, is an optionally branched alkyl radical having 1 to 7 C atoms, preferably 1 to 3 C atoms, a halogen, a group —O—C(═O)—$R_4$ or a group —O$R_4$, where $R_4$, identical or different, is hydrogen, a methoxyethyl group or an optionally branched alkyl radical having 1 to 7 C atoms, preferably 1 to 3 C atoms, or a cycloalkyl radical having 4 to 6 C atoms, $R_3$, identical to or different from $R_1$ and $R_2$, is a group —O—C(═O)—$R_4$, a halogen or a group —O$R_4$, where $R_4$, identical or different, is hydrogen, a methoxyethyl group or an optionally branched alkyl radical having 1 to 7 C atoms, preferably 1 to 3 C atoms, or a cycloalkyl radical having 4 to 6 C atoms,
and
m is an integer 1 or 2.

As an aminosilane containing at least one hydrolyzable silane group it is preferred to use at least one compound selected from the group encompassing 4-aminobutyltriethoxysilane, 1-amino-2-(dimethylethoxysilyl)-propane, N-(2-aminoethyl)-3-aminoisobutyldimethylmethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, N-(6-aminohexyl) aminomethyltrimethoxysilane, N-(6-aminohexyl) aminopropyltrimethoxysilane, N-(2-aminoethyl)-11-aminondecyltrimethoxysilane, 3-(m-aminophenoxy) propyltrimethoxysilane, m-aminophenyltrimethoxysilane, p-aminophenyltrimethoxysilane, N-3-[amino(polypropyleneoxy)]aminopropyltrimethoxysilane, 3-aminopropyldiisopropylethoxysilane, 3-aminopropyldimethylethoxysilane, 3-aminopropylmethyldiethoxysilane, 3-aminopropyltriethoxysilane, 3-aminopropyltrimethoxysilane, 11-aminoundecyltriethoxysilane, 3-aminopropyltricyclohexoxysilane, 3-aminopropyldicyclohexoxymethylsilane, 3-aminopropyldicyclohexoxyethylsilane, N-methylaminopropyltricyclohexoxysilane, N-phenylaminopropyltricyclohexoxysilane, N-methylaminopropylmethyldicyclohexoxysilane, N-phenylaminopropylmethyldicyclohexoxysilane, bis(2-hydroxyethyl)-3-aminopropyltriethoxysilane, bis(methyldiethoxysilylpropyl)amine, bis(triethoxysilylpropyl)amine, bis(trimethoxysilylpropyl)amine, bis[(3-trimethoxysilyl)propyl]ethylenediamine, bis(3-trimethoxysilylpropyl)-N-methylamine, n-butyl-3-aminopropyltrimethoxysilane, tert-butyl-3-aminopropyltrimethoxysilane, 3-(2,4-dinitrophenylamino)propyltriethoxysilane, N-ethylaminoisobutylmethyldiethoxysilane, N-ethylaminoisobutyltrimethoxysilane, N-methylaminopropylmethyldimethoxysilane, N-methylaminopropyltrimethoxysilane, N-phenylaminomethyltriethoxysilane, N-phenylaminomethyltrimethoxysilane, N-cyclohexyl-3-aminopropyltrimethoxysilane, 3-(N-styrylmethyl-2-aminoethylamino)propyltrimethoxysilane, (3-trimethoxysilylpropyl) diethylenetriamine, (3-triethoxysilylpropyl) diethylenetriamine, N-cyclohexylaminomethylmethyldiethoxysilane, N-cyclohexylaminomethyltriethoxysilane, N-phenylaminomethyltriethoxysilane, 3-aminopropyldimethoxymethylsilane, 4-amino-3,3-dimethylbutyldimethoxymethylsilane, 4-amino-3,3-dimethylbutyldimethoxymethylsilane, and mixtures thereof.

As a thiosilane containing at least one hydrolyzable silane group it is possible to use at least one compound selected from the group encompassing mercaptomethylmethyldiethoxysilane, 3-mercaptopropylmethyldimethoxysilane, 3-mercaptopropyltriethoxysilane, 3-mercaptopropyltrimethoxysilane or mixtures thereof.

As an isocyanatosilane containing at least one hydrolyzable silane group it is possible to use at least one compound selected from the group encompassing 3-isocyanatopropyldimethylchlorosilane, 3-isocyanatopropyltriethoxysilane, 3-isocyanatopropyltrimethoxysilane, (isocyanatomethyl)methyldimethoxysilane or mixtures thereof.

Furthermore, as an epoxysilane compound containing at least one hydrolyzable silane group, it is possible to use a compound selected from the group encompassing 2-(3,4-epoxycyclohexyl)ethyltriethoxysilane, 2-(3,4-epoxycyclohexyl)ethyltrimethoxysilane, 5,6-epoxyhexyltriethoxysilane, 5,6-epoxyhexyltrimethoxysilane, 5,6-epoxyhexylmethyldimethoxysilane, 5,6-epoxyhexylmethyldiethoxysilane, 5,6-epoxyhexyldimethylethoxysilane, 5,6-epoxyhexyldimethylmethoxysilane, (3-glycidyloxypropyl)dimethylethoxysilane, (3-glycidyloxypropyl)dimethylmethoxysilane, (3-glycidyloxypropyl)methyldiethoxysilane, (3-glycidyloxypropyl)methyldimethoxysilane, (3-glycidyloxypropyl)triethoxysilane, (3-glycidyloxypropyl)trimethoxysilane or mixtures thereof.

Suitable in principle as amines which comprise no hydrolyzable silane group and which are employed optionally in the case of the preparation of the adhesion promoter a) and mandatorily in the case of the preparation of the adhesion promoter b) are all compounds which contain at least one primary or secondary amino group, preferably at least one primary amino group.

Preferred amines are branched and unbranched aliphatic amines preferably with $C_1$-$C_{20}$, which optionally may be substituted by hydroxyl groups and/or alkoxy groups; cycloaliphatic amines with $C_4$-$C_{20}$, which optionally may be substituted by hydroxyl groups and/or alkoxy groups; and aromatic amines with $C_6$-$C_{24}$, which optionally may be substituted by hydroxyl groups and/or alkoxy groups. Preferred amines of this kind are monomethylamine, monoethylamine, n-propylamine, isopropylamine, butylamine, n-pentylamine, tert-butylamine, hexylamine, octylamine, 2-ethylhexylamine, dodecylamine, tridecylamine, oleylamine, dimethylamine, diethylamine, dipropylamine, dibutylamine, dihexylamine, bis(2-ethylhexyl)amine, bis(tridecyl)amine, 3-methoxypropylamine, 2-ethoxyethylamine, 3-ethoxypropylamine, 3-(2-ethylhexyloxy)propylamine, cyclopentylamine, cyclohexylamine, 1-phenylethylamine, dicyclohexylamine, benzylamine, N-methylbenzylamine, N-ethylbenzylamine, 2-phenylethylamine, aniline, o-toluidine, 2,6-xylidine, 1,2-phenylenediamine, 1,3-phenylenediamine, 1,4-phenylenediamine, o-xylylenediamine, m-xylylenediamine, p-xylylenediamine, ethylenediamine, 1,3-propanediamine, 1,2-propanediamine, 1,4-butanediamine, 1,2-butanediamine, 1,3-butanediamine, neopentanediamine, hexamethylenediamine, octamethylenediamine, isophoronediamine, 4,4'-diaminodicyclohexylmethane, 3,3'-dimethyl-4,4'-diaminodicyclohexylmethane, 4,4'-diaminodiphenylmethane, 4,9-dioxadodecane-1,12-diamine, 4,7,10-trioxamidecane-1,13-diamine, 3-(methylamino) propylamine, 3-(cyclohexylamino)propylamine, 3-(diethylamino)ethylamine, 3-(dimethylamino)propylamine, 3-(diethylamino)propylamine, diethylenetriamine, triethylenetetramine, tetraethylenepentamine, 3-(2-aminoethyl)aminopropylamine, dipropylenetriamine, N,N-bis(3-aminopropyl)methylamine, N,N'-bis(3-aminopropyl)ethylenediamine, bis(3-dimethylaminopropyl)amine, N-(3-aminopropyl)imidazole, monoethanolamine, 3-amino-1-propanol, isopropanolamine, 5-amino-1-pentanol, 2-(2-aminoethoxy)ethanol, aminoethylethanolamine, N-(2-hydroxyethyl)-1,3-propanediamine, N-methylethanolamine, N-ethylethanolamine, N-butylethanolamine, diethanolamine, 3-((2-hydroxyethyl)amino)-1-propanol, diisopropanolamine, N-(2-hydroxyethyl)aniline, 1-methyl-3-phenylpropylamine, furfurylamine, N-isopropylbenzylamine, 1-(1-naphthyl)ethylamine, N-benzylethanolamine, 2-(4-methoxyphenyl)ethylamine, N,N-dimethylaminoethylamine, ethoxypropylamine, 2-methoxyethylamine, 2-ethoxyethylamine, 2-cyclohexenylethylamine, piperidine, diethylaminopropylamine, 4-methylcyclohexylamine, hydroxynovaldiamine, 3-(2-ethylhexyloxy)propylamine, tris(2-aminoethyl)amine, N,N'-di-tert-butylethylenediamine, tris(hydroxymethyl)aminomethane.

It is possible, furthermore, to use amino-terminal polyethers where the polyether consists on the basis of an alkylene oxide, preferably ethylene oxide and/or propylene oxide and/or, optionally, further epoxides (e.g., butylene oxide, styrene oxide) or tetrahydrofuran, and which are functionalized with amino groups.

Depending on their structural composition, the compounds may carry one, two or more than two amino groups. Products of this kind are sold by, for example, Huntsman under the name "Jeffamines" or by BASF as "polyetheramine" and carry, for example, the designations M-600, M-1000, M-2005, M-2070, D-230, D-400, D-2000, D-4000, T-403, T-3000, T-5000, polytetrafuranamine 1700, ED-600, ED-900, ED-2003, HK-511, EDR-148, EDR-176, SD-231, SD-401, SD-2001, ST-404.

As amines it is possible, furthermore, to use dendritic polyimine structures such as, preferably, polyethyleneimines and/or propyleneimines, more preferably polyethyleneimines. These polyimines may optionally also be modified by partial alkoxylation of the amino functions.

Suitable reaction partners for the compounds containing at least one hydrolyzable silane group, for preparing the addition products a) and/or b), include optionally oligomeric or optionally polymeric compounds. These oligomeric or polymeric compounds with functional end groups are preferably polydisperse, meaning that they have no uniform chain length, and are also used polydispersely for addition reaction with the stated silane compounds.

These polydisperse, at least oligomeric compounds are preferably converted by addition reactions with molecularly uniform (i.e., monodisperse) organic compounds comprising hydrolyzable silane groups.

This reaction for preparing the adhesion promoters is based, in the case of the addition product a), on the addition reaction with optionally at least oligomeric compounds which contain at least two terminal ethylenically unsaturated double bonds, these terminal double bonds being acrylate and/or methacrylate groups, preferably acrylate groups. Addition-reacted with the optionally oligomeric compound are at least one aminosilane containing at least one hydrolyzable silane group, and optionally thiosilane.

In the addition reaction preferably 5 to 100 mol %, more preferably 10 to 90 mol %, very preferably 15 to 80 mol % of the double bonds are reacted with the aminosilanes and/or thiosilanes. The remaining up to 95 mol %, more preferably 90 to 10 mol %, very preferably 85 to 20 mol % of the double bonds are reacted with a further aminic component, which comprises no silane groups.

The adhesion promoter b) is prepared preferably by addition reaction with optionally oligomeric compounds which contain at least one terminal hydroxyl group and at least one terminal, ethylenically unsaturated double bond. These terminal double bonds are acrylate and/or methacrylate groups, preferably acrylate groups. Addition-reacted with the optionally oligomeric compound are an isocyanatosilane and/or epoxysilane containing at least one hydrolyzable silane group, and also at least one further, non-silane-functional amine.

Latter reaction is carried out preferably in two steps, with first the isocyanatosilane and/or epoxysilane being addition-reacted with the hydroxyl groups of the optionally oligomeric compound, and thereafter the terminal double bonds being reacted with a non-silane-functional monoamine or polyamine.

In this reaction, the hydroxyl groups are reacted with epoxysilanes and/or isocyanatosilanes preferably to an extent of more than 80 mol %, more preferably to an extent of more than 90 mol %, very preferably to an extent of more than 95 mol %, and the double bonds are reacted completely with a non-silane-functional mono- or polyamine.

The corresponding reaction conditions to be observed in the addition reactions for preparing the adhesion promoters a) and b), respectively, are known to the skilled person.

Preferred reaction partners for the compounds containing at least one hydrolyzable silane group, for preparing the addition products a) and/or b), are esters of aliphatic diols and polyols having 1-12 C atoms or cycloaliphatic diols and polyols having 4-12 C atoms or aromatic-aliphatic diols and polyols having 4-16 C atoms, whose OH groups have been esterified partially for preparing addition product (b) and completely for preparing addition product (a) with ethylenically unsaturated monocarboxylic acids, preferably (meth) acrylic acid. Suitable diols for esterification with (meth) acrylic acid are preferably ethanediol, 1,2-propanediol, 1,3-propanediol, 1,2-butanediol, 1,4-butanediol, 1,2-pentanediol, 1,4-pentanediol, 2,4-pentanediol, 1,2-hexanediol, 1,5-hexanediol, 1,6-hexanediol, 2,5-hexanediol, 1,7-heptanediol, 1,8-octanediol, neopentylglycol, bisphenol A, glycerol, trimethylolpropane, pentaerythritol, and optionally alkoxylation products of these diols and polyols with ethylene oxide and propylene oxide.

The compounds having terminal ethylenically unsaturated double bonds and optionally hydroxyl groups that are employed for preparing the respective addition product are optionally oligomeric compounds having at least two, optionally polymeric compounds having at least four repeating structural units. Such compounds are selected from the group encompassing polyethers, saturated polyesters, saturated polyester polyethers, polyamides, saturated polyesteramides, containing correspondingly modified end groups. In accordance with the invention, saturated polyester also embraces corresponding polycarbonates.

Suitable polyethers include compounds having the structural repeating unit where $W^1$ is an aliphatic radical having 1 to 15 C atoms, preferably having 2 to 8 C atoms, more preferably having 2 to 4 C atoms, an aromatic or cycloaliphatic ring or an aromatic-aliphatic moiety. The ether moiety may also be part of a chain-located ring.

Preferred saturated polyethers are polyethylene oxides, polypropylene oxides, poly(trimethylene) oxides, polybutylene oxides, polystyrene oxides, ethylene oxide/propylene oxide copolyethers, poly(tetrahydrofurans), which may optionally contain bisphenol A units in the main chain, copolymers of structural units of the stated polyethers or mixtures of at least two of the stated polyethers. Additionally it is also possible to use polyethers which derive from the ethers known as glycidyl ethers and are obtained by reaction of bisphenols with epichlorohydrin. Particularly preferred end group modified polyethers derive from polyethylene oxides, polypropylene oxides, and polyethers of ethylene oxide/propylene oxide. The polyethers preferably have a molecular weight of 100 to 10 000 g/mol, more preferably of 150 to 7500 g/mol, very preferably of 200 to 3000 g/mol.

Suitable end group modified saturated polyesters are preferably correspondingly modified, saturated polyesters, i.e., polyesters which are not ethylenically unsaturated, such as polyesters of lactones such as, for example, ε-caprolactone and/or δ-valerolactone, and also polyesters obtained by condensation of α,ω-hydroxycarboxylic acids or by condensation of dicarboxylic acids with diols. As acid components it is possible to use alternatively dicarboxylic acids, their acid halides, acid anhydrides or esters; more particularly, the following dicarboxylic acids are suitable: oxalic acid, malonic acid, dimethylmalonic acid, succinic acid, glutaric acid, adipic acid, trimethyladipic acid, pimelic acid, 2,2-dimethylglutaric acid, azelaic acid, sebacic acid, 1,3-cyclopentanedicarboxylic acid, 1,2-cyclohexanedicarboxylic acid, 1,4-cyclohexanedicarboxylic acid, phthalic acid, terephthalic acid, isophthalic acid, 2,5-norbornanedicarboxylic acid, 1,4-naphthalenedicarboxylic acid, diphenic acid, 4,4'-oxydibenzoic acid, diglycolic acid, thiodipropionic acid, 4,4'-sulfonyldibenzoic acid, 2,5-naphthalenedicarboxylic acid, tricyclodecanedicarboxylic acid.

Suitable diols for reaction with the saturated dicarboxylic acids are preferably ethanediol, 1,2-propanediol, 1,3-propanediol, 1,2-butanediol, 1,4-butanediol, 1,2-pentanediol, 1,4-pentanediol, 2,4-pentanediol, 1,2-hexanediol, 1,5-hexanediol, 1,6-hexanediol, 2,5-hexanediol, 1,7-heptanediol, 1,8-octanediol, neopentylglycol.

Particularly preferred oligomeric, optionally polymeric polyesters employed are poly(ε-caprolactone), poly(δ-valerolactone), caprolactone/valerolactone copolyesters, polylactide, polyethylene terephthalate, and polybutylene terephthalate.

End group modified polyesters also embrace polycarbonates having the structural repeating unit In this unit, $W^2$ is an aliphatic radical having 2 to 15 C atoms, preferably having 2 to 12 C atoms, more preferably having 2 to 8 C atoms, or is an aromatic or cycloaliphatic radical or an aromatic-aliphatic moiety, preferably a bisphenol A radical or radical derived therefrom. The carbonate moiety may also be part of a chain-located ring.

Also suitable are mixed, saturated polyesters of carbonic acid and other acids (polyester-polycarbonates). Preferred polycarbonates are bisphenol A polycarbonate, bisphenol F polycarbonate, bisphenol AF polycarbonate, polycarbonates based on bisphenol A and bisphenol TMC, and also those based on 1,6-hexanediol. In accordance with the invention the term "polyester" also embraces polycarbonates or copolyester carbonates.

Preferred polyesters are polyesters having a molecular weight of 150 to 15 000 g/mol, more preferably of 200 to 7500 g/mol, very preferably of 250 to 3000 g/mol.

End group-modified polyamides having the structural repeating unit may also be used for preparing the adhesion promoters employed in accordance with the invention. Typical building blocks contemplated for polyamides include the following: ε-caprolactam, aminocaproic acid, enantholactam, 7-aminoheptanoic acid, 11-aminoundecanoic acid, 9-aminononanoic acid or mixtures thereof. Where the polyamide is prepared by poly-condensation of a diamine and a dicarboxylic acid, diamines used may be preferably tetramethylenediamine, hexamethylenediamine, nonamethylenediamine, decamethylenediamine, undecanemethylenediamine, dodecamethylenediamine, para-aminoaniline or meta-xylenediamine, and dicarboxylic acid used may be preferably adipic acid, sebacic acid, dodecanedicarbon acid, glutaric acid, terephthalic acid, 2-methylterephthalic acid, isophthalic acid, dimeric acid, and naphthalenedicarboxylic acid.

In addition to diacids or diamines it is also possible as well to use polyfunctional compounds, such as trimellitic acid and pyromellitic acid, having three or more functional groups, at up to 5 mol %.

Preferred polyamides are those having a molecular weight of 150 to 15 000 g/mol, more preferably of 200 to 7500 g/mol, very preferably of 250 to 3000 g/mol.

Particularly preferred polyamides employed derive from nylon 6, nylon 7, nylon 8, nylon 10, nylon 2, nylon 66, nylon 69, nylon 610, nylon 611, nylon 612, nylon 6T, nylon 6/66, nylon 6/12, nylon 6/6T.

It is also possible to use end group modified polyesteramides having the structural units recited above.

The recited polymers may be of linear, branched or star-shaped construction. Access to branched or star-shaped polymers is possible through use of suitable polyfunctional starting compounds.

Particularly preferred oligomeric and/or polymeric compounds are polyethylene oxides, polypropylene oxides, polystyrene oxide, polyethers of ethylene oxide/propylene oxide, and poly(ε-caprolactone) esters.

The adhesion promoters employed in accordance with the invention are present in the coating at preferably less than 5% by weight, more preferably less than 2% by weight, very preferably less than 1% by weight, based on the total weight of the coating.

Alternatively the adhesion promoter may also be used as a component in a preliminary coat applied to the substrate surface prior to the actual coating, preferably in the amount indicated above.

The adhesion promoters a) and b) employed in accordance with the invention are suitable for enhancing the adhesion of coatings based on at least one polymer as coating material, the production of the coating having been accompanied preferably by at least partial reaction of at least one functional group of the addition product a) and/or b), present as adhesion promoter, with reactive groups of the coating material.

The coatings preferably may be based on a synthetic, semisynthetic or natural polymer or on a mixture of at least two of these polymers. With particular preference it is possible as coating material to use at least one polymer selected from the group encompassing polyurethanes, saturated polyesters, polyamides, polyolefins, polyvinyl chlorides, polystyrenes, polycarbonates, poly(meth)acrylates, acrylonitrile/butadiene/styrene copolymers, unsaturated polyesters, epoxy resins, phenol-formaldehyde resins, melamine-formaldehyde resins, phenolic resins, silicone resins, polylactides, polyvinyl acetates, cellulose ethers, cellulose esters, polysaccharides, starch or a mixture of at least two of said polymers.

Through the use of the adhesion promoters employed in accordance with the invention it is possible for a coating based on at least one of the aforementioned polymers to be applied with excellent adhesion to a multiplicity of substrate surfaces. These substrate surfaces that can be coated with such polymers include metal surfaces as recited below, glass surfaces, plastics surfaces optionally different from the coating polymer, such as, for example, surfaces of an optionally filled and/or glass fiber-reinforced, thermoplastic, thermoset, and elastomeric plastic, or of a mixture of at least two of these stated plastics, or the surface of an existing coating, based for example on an optionally filled and/or pigmented epoxy resin, alkyd resin or acrylate resin. It is also possible successfully to apply a coating based on the aforementioned polymers, by means of the adhesion promoters employed in accordance with the invention, to a surface of a cellulose material, preferably of paper, more particularly an untreated or pretreated, drenched, mordented or impregnated paper, optionally reinforced with fibers of glass, plastic and/or carbon, or to an optionally pretreated wood surface, with excellent adhesion.

Alternatively to a coating with a layer-form arrangement based on one of the aforementioned polymers, it is also possible for a film-form coating based on a curable surface-coating system to be joined by means of the adhesion promoters a) and/or b), employed in accordance with the invention, to substrate surfaces of any of a very wide variety of materials, with excellent adhesion. This also illustrates the universal usefulness of the adhesion promoters used in accordance with the invention.

As curable binders it is preferred to utilize those which are able to react at least partly with the hydrolyzable silane groups of the promoter a) or b) or with its further functional groups, preferably amino groups. For these binders there exist multivarious examples, as are described in, for example, T. Brock/M. Groteklaes/P. Mischke, "Lehrbuch der Lacktechnologie", Vincentz Verlag, Hanover 1998 and D. Stoye/W. Freitag, "Lackharze—Chemie, Eigenschaften, Anwendung", Carl Hanser Verlag, Munich/Vienna 1996 and T. A. Turner, "Canmaking—The Technology of Metal Protection and Decoration", Blackie Academic Professional, London 1998 and in H.-G. Elias, "Polymere—Von Monomeren und Makromolekülen zu Werkstoffen", Hüthig & Wepf Verlag, Heidelberg/Oxford 1996, and also B. Meuthen, A.-S. Jandel, "Coil Coating—Bandbeschichtung: Verfahren, Produkte und Märkte", Friedr. Vieweg & Sohn Verlag, Wiesbaden 2005.

A preferred example of a curable binder system are so-called epoxy binders, in which at least one curable component containing at least two epoxide groups is used in conjunction with a curing component. As a binder component containing epoxide groups, preferred suitability is possessed by an epoxy resin having at least two epoxide end groups, preferably a polymeric reaction product based on epichlorohydrin with optionally substituted, polyhydric phenols and/or polyhydric, aliphatic or alicyclic alcohols. The adhesion promoter employed in accordance with the invention may be reacted preferably through its aminic groups with the epoxide groups of the binder system.

Another example of a suitable curable binder system is represented by silicone-based binder systems, in which the curing takes place by a condensation procedure of the alkoxysilane groups, acyloxysilane groups and/or silanol groups present, to give polysiloxanes. The adhesion promoters employed in accordance with the invention may react preferably through their silane groups and/or their hydrolysed form with the alkoxysilane, acyloxy and/or silanol groups of the binder system.

Another example of a suitable curable binder system are binders which comprise at least difunctional isocyanate compounds, which are crosslinked with at least difunctional isocyanate-reactive components, such as compounds comprising alcohol groups or amino groups, for example. The addition products of the invention are able to react preferably through their aminic groups with the isocyanate groups of the binder.

Another example of a curable binder system are systems with a binder based on functional polyacrylate or polyester/melamine systems. The addition products of the invention are able preferably through their aminic groups to enter into a reaction with functional groups of the binder.

Another example of a curable binder system are systems having a binder based on polyester/carboxylic acids. The adhesion promoters employed in accordance with the invention are able preferably through their aminic groups to react with the functional groups of the binder.

Another example of a curable binder system are radiation-curable systems, which are radically crosslinked in the curing procedure. These binder systems comprise compounds having ethylenically unsaturated groups, preferably (meth)acrylate groups or unsaturated polyester groups, and are typically used in conjunction with copolymerizable (meth)acrylate-functional reactive diluents. The adhesion promoters employed in accordance with the invention are able preferably through their aminic groups to react with the (meth)acrylate groups or unsaturated polyester groups of the binder and/or of the reactive diluent.

Another example of a curable binder system are systems having a binder based on polyesteramides or polyamideimides, whose functional groups are able to react with the adhesion promoters employed in accordance with the invention, more particularly with their aminic groups.

With particular preference, in the context of the use of the adhesion promoters employed in accordance with the invention, it is possible to use one of the following binder systems to be cured, based on i. a curable binder system comprising at least one compound containing at least two epoxide end groups, and at least one curing component, ii. a curable binder system comprising compounds containing alkoxysilane groups, acyloxysilane groups or silanol groups, iii. a curable binder system comprising at least difunctional polymers containing carboxylic acid groups, preferably polyesters, and at least one compound which contains at least two epoxy groups or at least two OH groups per molecule, iv. a curable binder system comprising at least one polyacrylate- or polyester/melamine-based binder, v. a radiation-curable binder system comprising a polymer containing at least two ethylenically unsaturated groups, and optionally at least one reactive diluent copolymerizable with these functional groups, the ethylenically unsaturated groups of the polymer preferably being (meth)acrylate groups, vinyl groups, allyl groups and/or unsaturated polyester groups, vi. a curable binder system comprising at least one at least difunctional polyesteramide and/or polyamideimide-based binder, vii. a curable binder system comprising at least one at least difunctional isocyanate compound whose isocyanate groups are optionally in blocked form, and at least one at least difunctional isocyanate-reactive component, viii. a curable binder system comprising at least one polymer containing at least two epoxide end groups, and a phenolic resin and/or ix. a curable binder system comprising at least one amino resin, preferably melamine resin or urea resin.

For each of these binders the accompanying use of a catalyst may be necessary. Curing and/or drying of the binder systems may optionally be carried out thermally or photochemically. Also possible, optionally, are combinations of these binders with one another or with further prior-art binders.

As curable binder system it is preferred to use a system based on a component containing epoxide end groups and being obtainable more preferably by reaction of epichlorohydrin with polyhydric phenols, very preferably by reaction with bisphenol A and/or bisphenol F, to give an epoxy resin, and also a mixture of these corresponding epoxy resins.

Where a curing component is used as an accompaniment during the curing of the binder system, suitable curing agents include polyamines, carboxylic anhydrides, carboxylic acids, polyphenols, amino resins, phenolic resins, catalytically curing compounds (e.g., ferrocenes, triarylsulfonium compounds), preferably polyamines or carboxylic anhydrides, as set out in, for example, Stoye/Freitag, "Lackharze: Chemie, Eigenschaften and Anwendungen", Verlag Hanser Fachbuch, or in DE 10 2005 046 641 A1, or in the catalogue "UPPC Lieferprogramm: Epoxidharzharter, Epoxidharze, Glycidether" from UPPC AG, 88487 Mietringen-Baltringen. The corresponding disclosure content is hereby introduced as disclosure content of the present application.

Examples of curing components containing amino groups are aliphatic, cyloaliphatic, araliphatic di- and/or poly-functional amines. These include, among others, primary, aliphatic polyamines e.g., ethylenediamine, diethylenetriamine, triethylenetetramine, tetraethylenepentamine, pentaethylenehexamine, and homologues, 1,3-pentanediamine, propylenediamine, hexamethylenediamine, dipropylenetriamine, polyoxyethylenepolyamines, polyoxypropylenepolyamines, polytetrahydrofuran polyamines, modified aliphatic amines for example, Mannich bases or products prepared by reaction of primary amines with glycidyl ethers or carboxylic acids, preferably fatty acids, hydroxylated primary amines, cycloaliphatic amines such as, for example, isophoronediamine, diaminocyclohexane, N-aminoethylpiperazine, tricyclodecanetriamine, aromatic polyamines such as, for example, phenylenediamines, methylenedianiline, diaminodiphenylmethane, diaminodiphenyl sulfone, oralyphatic amines such as, for example, xylylenediamine.

For example it is possible as curing agents also to use carboxylic anhydrides such as ortho-phthalic anhydride, hexahydrophthalic anhydride, methyltetrahydrophthalic anhydride.

Curing of binder systems containing epoxy resins may also take place, optionally, in combination with isocyanate resins, optionally also with blocked isocyanates.

Typical epoxy resins, curing agents, and accelerators, and also the conditions under which they are used, optionally in combined use with further adjuvants, are described in the relevant literature, such as, for example, in Stoye/Freitag, "Lackharze: Chemie, Eigenshaften and Anwendungen", Verlag Hanser Fachbuch, or in "Technische Information: Oberflächenschutz", volumes 1 and 2, published by Witco GmbH, Bergkamen, and also the literature listed therein. The corresponding disclosure content is hereby introduced as reference and is considered part of the disclosure content of the present application.

In accordance with the invention it is possible not only for the above-described coatings but also for surface-coating materials based on the stated binder systems to be put to diverse uses, these including their use for the coating, or surface-coating, of metal substrates, plastics surfaces or glass surfaces or for recoating of existing coatings and surface-coatings such as old coatings.

Suitable substrate surfaces for surface-coating films are, for example, an optionally pretreated and/or precleaned and/or passivated metal surface, a metal alloy surface, a plastics surface, a glass surface, a surface of a cellulose material, preferably of paper, more particularly of untreated or pretreated, drenched, mordented or impregnated paper, optionally reinforced with fibers of glass, plastic and/or carbon, a wood surface, or the surface of an existing, optionally spent or weathered coating.

One preferred group of substrates are metal surfaces. In the case of metal surfaces, enhancement of the surface-coating adhesion or coating adhesion is often accompanied by enhancement of the corrosion resistance of the material, more particularly in the case of an optionally pretreated metallic substrate surface of aluminum, iron, copper, zinc, tin, brass, bronze, of an aluminum alloy or of an iron alloy, preferably of steel, including stainless steel. Consequently, preferred substrate surfaces that may be furnished inventively with a well-adhering coating also include treated or untreated metal substrates. Examples of such metal surfaces are surfaces of aluminum, iron, copper, zinc, tin, and combinations thereof. Each of the stated metals may also be present as part of an alloy. For example, the term "aluminum" embraces not only aluminum but also aluminum alloys, an aluminum alloy being considered to be a metal in which aluminum is present in a proportion by weight which is at least as high as that of any other element present. Alloys of iron encompass, for example, cold-rolled steel and hot-rolled steel, electrogalvanized steel, and hot dip galvanized steel. It is possible for the metal surfaces to have undergone a surface treatment beforehand, as for example a phosphating, chromating or silane treatment. Further examples of metal surfaces are surfaces of brass or bronze.

The present invention also relates, however, to the use of the addition products a) and/or b) as adhesion-promoting additions to surface-coating systems applied to particularly difficult substrates. These include, on the one hand, substrates which are already surface-coated or coated. These substrates encompass more particularly surfaces already coated with a prior-art surface-coating material, such as an epoxy material, for example, the coatings in question possibly being old coatings which on account of weathering processes have undergone a chemical alteration as compared with a newly surface-coated surface. These aged, organic coatings are preferably coatings based, for example, on filled and/or pigmented alkyd resins or acrylate resins.

On the other hand, surfaces of plastic are also among substrate surfaces that are difficult to coat. These plastics may be optionally filled and/or fiber-reinforced thermoplastics, thermosets, elastomers such as, for example, polyethylene (PE), polypropylene (PP), polyvinyl chloride (PVC), polystyrene (PS), polycarbonate (PC), polymethyl methacrylate (PMMA), acrylonitrile-butadiene-styrene copolymers (ABS), polyamide (PA), polyoxymethylene (POM), saturated polyesters (e.g., polyethylene terephthalate and polybutylene terephthalate), unsaturated polyesters (UP), epoxy resins (EP), phenol-formaldehyde resins, melamine resins (MF), phenolic resins (PF), polyurethanes (PU), ethylene-propylene-diene elastomers (EPDM), and also commercial blends of the stated plastics.

The present invention also relates, furthermore, to the use of the addition products a) and/or b) as adhesion-promoting additions (adhesion promoters) to surface-coating systems and/or to the stated plastics coating materials which are used on glass surfaces of untreated or pretreated kind.

The present invention also relates, moreover, to the use of the addition products a) and/or b) as adhesion-promoting additions to surface-coating systems and/or to the stated plastics coating materials on surfaces comprising cellulose materials such as on wood substrates or woodlike substrates; woodlike substrate surfaces also include those which comprise wood in processed form, examples being composites based on wood or else paper. In this context, the wood substrate or woodlike substrate (e.g., paper), as already mentioned, may be present in untreated form or else in pretreated form (e.g., drenched, mordented, impregnated).

The deployment of the addition products a) and/or b) as adhesion promoters may take place (1) initially either by introduction of the adhesion promoter as an additive into the coating material or into the surface-coating system, or (2) by use of the adhesion promoter as at least one component in a pretreatment, in which the adhesion promoter or a composition comprising the adhesion promoter is applied to the substrate surface before the surface-coating system or the coating material is applied. The latter is possible in the case, for example, of a powder coating.

Furthermore, the coatings, as a coat film or surface-coating film, may if necessary comprise customary auxiliaries as processing additives such as antifoams, deaerating agents, inhibitors, stabilizers such as antioxidants, light stabilizers, heat stabilizers, and flame retardants, modifiers such as wetting agents, plasticizers, thickeners, thixotropic agents, impact modifiers, expandants and/or surface modifiers such as antistats, hydrophobizing agents, hydrophilizing agents, waxes, organic and/or inorganic pigments and fillers, preferably of materials which are different from substrate materials to be coated, wetters, and dispersants. The corresponding additives are selected in a known way in accordance with the ultimate end use, which may be decorative and/or technical. Furthermore, the coatings may also be printed and/or embossed.

Additionally provided by the invention is a process for producing a covering or a coating on one of the stated substrate surfaces, whereby at least one above-described surface-coating system or coating material comprising an adhesion promoter a) and/or b) and optionally customary auxiliaries is applied to a substrate surface, and the surface-coating system or the coating applied to the substrate surface is alternatively physically dried, baked and/or cured and/or crosslinked.

An alternative process for producing a covering or a coating on one of the stated substrate surfaces is such that at least one above-described surface-coating system or coating material is applied to a substrate surface which has already been provided with a preliminary coat comprising at least one addition product a) and/or b), and the applied surface-coating system or the coating material is alternatively physically dried, baked and/or cured and/or crosslinked. The preliminary coating applied before the actual surface-coating film is produced may be based on at least one of the stated adhesion promoters and optionally further components such as wetting assistants or flow control agents, for example.

In a further aspect, the present invention provides an object or an article whose metal surface, preferably of aluminum, iron, copper, zinc, tin or a metal alloy, preferably of an aluminum alloy or iron alloy, brass or bronze, or whose plastics surface or glass surface, or whose surface of cellulose material has been provided with at least one of the above-described coatings produced using at least one addition product a) and/or b) as adhesion promoter.

Likewise provided by the invention is an object or article whose layer form or film form coating produced using at least one of the above-described addition products a) and/or b) as adhesion promoter is based on a synthetic, semisynthetic and/or natural polymer.

Further provided in an aspect of the present invention is an object or an article whose coating in the form of a surface-coating film produced using at least one of the above-described addition products a) and/or b) as adhesion promoter is based on at least one of the stated curable binder systems.

EXAMPLES

Compounds used in the examples are as follows:

| Name | Description of the compound |
| --- | --- |
| Diacrylate A | ethoxylated bisphenol A diacrylate, on average 4 ethylene oxide units per molecule |

-continued

| Name | Description of the compound |
| --- | --- |
| Diacrylate B | Desmolux WDJ 4529, a linear unsaturated aliphatic urethane acrylate, reactive diluent-free; from Bayer MaterialScience |
| Diacrylate C | polyethylene glycol 200 diacrylate |
| Monoacrylate D | OH-terminal polyester monoacrylate (polyester based on 2 units of ε-caprolactone) |

I Preparation of the adhesion promoters

The adhesion promoters may optionally be prepared in an organic solvent. In the information below, the abbreviation NMR stands for nuclear magnetic resonance spectroscopy.

Adhesion Promoter 1:

34.60 g of hexanediol diacrylate and 120.00 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 10 minutes 24.90 g of 3-aminopropyltrimethoxysilane are added dropwise, and cooling is carried out to ensure that the temperature of the reaction mixture does not exceed 40° C. This is followed by stirring at 30° C. for 4 hours more. Subsequently 20.50 g of triethylenetetramine are added dropwise over the course of 8 minutes. This is followed by stirring at 30° C. for 6 hours more. Product: the acrylate groups have been fully reacted (determined via $^1$H NMR spectroscopy). The active substance is obtained as a 40% strength solution in 1-methoxy-2-propyl acetate.

Adhesion Promoter 2:

33.50 g of dipropylene glycol diacrylate and 120.00 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 10 minutes 22.50 g of 3-aminopropyltrimethoxysilane are added dropwise, and cooling is carried out to ensure that the temperature of the reaction mixture does not exceed 40° C. This is followed by stirring at 30° C. for 5 hours more. Subsequently 24.0 g of tetraethylenepentamine are added dropwise over the course of 8 minutes. This is followed by stirring at 30° C. for 6 hours more. Product: the acrylate groups have been fully reacted (determined via $^1$H NMR spectroscopy). The active substance is obtained as a 40% strength solution in 1-methoxy-2-propyl acetate.

Adhesion Promoter 3:

47.10 g of diacrylate A and 120.00 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 10 minutes 15.90 g of 3-aminopropyltrimethoxysilane are added dropwise, and cooling is carried out to ensure that the temperature of the reaction mixture does not exceed 40° C. This is followed by stirring at 30° C. for 4 hours more. Subsequently 17.00 g of tetraethylenepentamine are added dropwise over the course of 8 minutes. This is followed by stirring at 30° C. for 6 hours more. Product: the acrylate groups have been fully reacted (determined via $^1$H NMR spectroscopy). The active substance is obtained as a 40% strength solution in 1-methoxy-2-propyl acetate.

Adhesion Promoter 4:

54.3 g of tripropylene glycol diacrylate and 120.00 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 10 minutes 14.60 g of 3-aminopropyltrimethoxysilane are added dropwise, and cooling is carried out to ensure that the temperature of the reaction mixture does not exceed 40° C. This is followed by stirring at 30° C. for 4 hours more. Subsequently 11.10 g of 1,3-xylylenediamine are added dropwise over the course of 8 minutes. This is followed by stirring at 30° C. for 6 hours more. Product: the acrylate groups have been fully reacted (determined via $^1$H NMR spectroscopy). The active substance is obtained as a 40% strength solution in 1-methoxy-2-propyl acetate.

Adhesion Promoter 5:

48.10 g of diacrylate C and 120.00 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 10 minutes 22.80 g of bis[3-(trimethoxysilyl)propyl]amine are added dropwise, and cooling is carried out to ensure that the temperature of the reaction mixture does not exceed 40° C. This is followed by stirring at 30° C. for 5 hours more. Subsequently 9.10 g of 1,3-xylylenediamine are added dropwise over the course of 8 minutes. This is followed by stirring at 30° C. for 6 hours more. Product: the acrylate groups have been fully reacted (determined via $^1$H NMR spectroscopy). The active substance is obtained as a 40% strength solution in 1-methoxy-2-propyl acetate.

Adhesion Promoter 6:

22.50 g of diacrylate C and 64.40 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 7 minutes 11.20 g of 3-aminopropyltrimethoxysilane are added dropwise, and cooling is carried out to ensure that the temperature of the reaction mixture does not exceed 40° C. This is followed by stirring at 30° C. for 4 hours more. Subsequently 9.2 g of triethylenetetramine are added dropwise over the course of 2 minutes. This is followed by stirring at 30° C. for 6 hours more. Product: the acrylate groups have been fully reacted (determined via $^1$H NMR spectroscopy). The active substance is obtained as a 40% strength solution in 1-methoxy-2-propyl acetate.

Adhesion Promoter 7:

22.50 g of diacrylate C and 60.20 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 8 minutes 11.20 g of 3-aminopropyltrimethoxysilane are added dropwise, and cooling is carried out to ensure that the temperature of the reaction mixture does not exceed 40° C. This is followed by stirring at 30° C. for 4 hours more. Subsequently 6.45 g of diethylenetriamine are added dropwise over the course of 2 minutes. This is followed by stirring at 30° C. for 6 hours more. Product: the acrylate groups have been fully reacted (determined via $^1$H NMR spectroscopy). The active substance is obtained as a 40% strength solution in 1-methoxy-2-propyl acetate.

Adhesion Promoter 8:

40.00 g of dipropylene glycol diacrylate are introduced into a round-bottomed flask with reflux condenser, gas inlet, temperature sensor, dropping funnel, and KPG stirrer and are heated to 30° C. The reaction is carried out under a stream of nitrogen. Over the course of 15 minutes 29.23 g of 3-aminopropyltriethoxysilane are added dropwise, and cooling is carried out to ensure that the temperature of the reaction mixture does not exceed 40° C. This is followed by stirring at 35° C. for 1 hour more. Subsequently 28.15 g of isophoronediamine are added dropwise over the course of 10 minutes. This is followed by stirring at 30° C. for 5 hours more. Product: the acrylate groups have been fully reacted (determined via $^1$H NMR spectroscopy).

Adhesion Promoter 9:

50.00 g of diacrylate B are introduced into a round-bottomed flask with reflux condenser, gas inlet, temperature sensor, dropping funnel, and KPG stirrer and are heated to 30° C. The reaction is carried out under a stream of nitrogen. Over the course of 12 minutes 14.03 g of 3-aminopropyltriethoxysilane are added dropwise, and cooling is carried out to ensure that the temperature of the reaction mixture does not exceed 40° C. This is followed by stirring at 35° C. for 1 hour more. Subsequently 13.49 g of isophoronediamine are added dropwise over the course of 6 minutes. This is followed by stirring at 30° C. for 1 hour, during which there is an increase in viscosity. This in turn is followed by dilution with 19.38 g of 1-methoxy-2-propyl acetate, in order to reduce the viscosity of the reaction mixture, the active substance being present as an 80% strength solution in 1-methoxy-2-propyl acetate. This is followed by stirring at 30° C. for 5 hours. Product: the acrylate groups have been fully reacted (determined via $^1$H NMR spectroscopy).

Adhesion Promoter 10:

210.00 g of diacrylate C and 652.47 g of 1-methoxy-2-propyl acetate are introduced into a round-bottomed flask with reflux condenser, gas inlet, temperature sensor, dropping funnel, and KPG stirrer and are heated to 30° C. The reaction is carried out under a stream of nitrogen. Over the course of 20 minutes 114.60 g of 3-aminopropyltriethoxysilane are added dropwise, and cooling is carried out to ensure that the temperature of the reaction mixture does not exceed 40° C. This is followed by stirring at 35° C. for 4 hours more. Subsequently 110.38 g of isophoronediamine are added dropwise over the course of 15 minutes. This is followed by stirring at 30° C. for 5 hours more. Product: the acrylate groups have been fully reacted (determined via $^1$H NMR spectroscopy). The active substance is obtained as a 40% strength solution in 1-methoxy-2-propyl acetate.

Adhesion Promoter 11:

75.00 g of the monoacrylate D and 1.17 g of dibutyltin dilaurate solution (1% in xylene) are introduced into a round-bottomed flask with reflux condenser, gas inlet, temperature sensor, dropping funnel, and KPG stirrer. The reaction is carried out under a stream of nitrogen. The reaction mixture is heated to 80° C. Over the course of 7 minutes 27.90 g of 3-isocyanatopropyltrimethoxysilane are added dropwise, the temperature rising to 100° C. Cooling is carried out to lower the temperature to 80° C. again. This is followed by stirring at 80° C. for 2.5 hours more. Intermediate: the isocyanate groups have been fully reacted, hydroxyl end groups are no longer detectable (determined via $^{13}$C NMR spectroscopy); the ratio of acrylate double bonds to silane groups is 1.05:1 (determined via $^1$H NMR spectroscopy; theoretical: 1:1).

The reaction mixture is cooled to 30° C. and 14.02 g of diethylenetriamine are added. This is followed by stirring for 6 hours more, during which the temperature does not exceed 35° C. The acrylate groups have been fully reacted (determined via $^1$H NMR spectroscopy).

Adhesion Promoter 12:

40.00 g of diacrylate C are introduced into a round-bottomed flask with reflux condenser, gas inlet, temperature sensor, dropping funnel, and KPG stirrer and heated to 30° C.

The reaction is carried out under a stream of nitrogen. Over the course of 20 minutes 24.90 g of 3-aminopropyltriethoxysilane are added dropwise and cooling is carried out to ensure that the temperature of the reaction mixture does not exceed 40° C. This is followed by stirring at 30° C. for 6 hours more. Product: the acrylate groups have been fully reacted (determined via $^1$H NMR spectroscopy).

Adhesion Promoter 13:

227.40 g of 1-methoxy-2-propyl acetate and 79.60 g of 3-aminopropyltrimethoxysilane are introduced into a round-bottomed flask with reflux condenser, gas inlet, temperature sensor, dropping funnel, and KPG stirrer at 25° C. The reaction is carried out under a stream of nitrogen. Over the course of 35 minutes 72.00 g of diacrylate C are added dropwise and cooling is carried out to ensure that the temperature of the reaction mixture does not exceed 40° C. This is followed by stirring at 25° C. for 6 hours more. Product: the acrylate groups have been fully reacted (determined via $^1$H NMR spectroscopy). The active substance is obtained as a 40% strength solution in 1-methoxy-2-propyl acetate.

II Use of the Adhesion Promoters

Commercially available raw materials as follows are employed in the performance examples:

| Name | Description of the raw material |
|---|---|
| Aerosil R 972 | hydrophobic fumed silica, aftertreated with dimethyldichlorosilane; Evonik, Essen |
| Bayferrox 130M | red pigment, micronized; synthetic iron oxide alpha-$Fe_2O_3$; Lanxess, Leverkusen |
| Blanc fixe micro | synthetic barium sulfate formed from high-purity solutions in a defined growth procedure, organically coated; Sachtleben Chemie GmbH |
| Blanc fixe N | synthetic barium sulfate formed from high-purity solutions in a defined growth procedure; Sachtleben Chemie GmbH |
| BYK-057 | silicone-free defoamer for preventing foaming during preparation, dispensing, and processing of solventborne and solvent-free surface-coating systems; solution of foam-destroying polymers, silicone-free; BYK-Chemie GmbH, Wesel |
| BYK-320 | silicone flow-control additive with defoaming properties; solution of a polyether-modified polymethylalkylsiloxane; BYK-Chemie GmbH, Wesel |
| BYK-358 N | acrylate additive for improving flow and increasing gloss; solution of an acrylate copolymer; BYK-Chemie GmbH, Wesel |
| BYK-A 530 | deaerating agent and defoamer for solventborne and solvent-free coatings; solution of foam-destroying polymers, silicone-containing; BYK-Chemie GmbH, Wesel |
| Cymel 303 | hexamethoxymethylmelamine, supplied in liquid form (>98% nonvolatiles), Cytek |
| Disperbyk-110 | wetting and dispersing additive for solventborne surface-coating systems; solution of a copolymer with acid groups; BYK-Chemie GmbH, Wesel |
| Dynapol Katalysator 1203 | nonionically blocked acid catalyst for accelerating the crosslinking of baking varnishes (50% strength in xylene) Evonik, Essen |
| Dynapol LH 820 | Polyester resin from Evonik, Essen |
| Dynapol LH 830-02 (60%) | polyester resin from Evonik, Essen (resin is diluted at 60% in Solvesso 150/butyl glycol) |
| Epikote 828 | medium-viscosity liquid epoxy resin prepared from bisphenol A and epichlorohydrin; Hexion Specialty Chemicals |
| Epikure 3155 | low-viscosity modified polyamide-epoxy curing agent based on dimerized fatty acid and polyamines; Hexion Specialty Chemicals |
| Irgacure 500 | photoinitiator from Ciba (liquid mixture of 50% 1-hydroxycyclohexyl phenyl ketone and 50% benzophenone) |
| Laromer PE 56 E | polyester acrylate from BASF, Ludwigshafen |
| Micro Talc AT1 | magnesite-type talc from Mondo Minerals |
| Solvesso 150 ND | aromatic-containing mineral oil, Imperial Oil Limited |
| Titandioxid R960 | rutile titanium dioxide pigment, prepared by the chloride process; DuPont |

A) Use in Epoxy Anticorrosion Coatings a) Substrate Preparation

The substrate used was a steel panel from Q-Panel of type QD-36 "steel smooth finish" with dimensions (height/width/thickness) of 152 mm×76 mm×0.5 mm.

The steel panels used for the testing were treated for 5 minutes in a Mucasol emulsion (2% strength by weight solution of Mucasol rapid cleaner in water, Brand GmbH & Co. KG, 97861 Wertheim/Main) under the action of an ultrasonic bath of type Branson 1200 Ultrasonic Cleaner, model B1200E-1 (Branson Ultrasonics Corporation, 41 Eagle Road, Danbury, Conn. 06813-1961, USA). The panels were subsequently rinsed off with fully demineralized water and then cleaned with ethyl acetate. Application of the coating system to each of the panels was carried out no later than 2 hours after cleaning.

b) Preparation of the Tested Coating Systems

The coating system used in each case was a solvent-free epoxy system having the following composition:

| | Raw material | Amount (g) |
|---|---|---|
| Component A | Epikote 828 | 34.5 |
| | BYK-A530 | 0.4 |
| | BYK-320 | 0.3 |
| | Blanc fixe N | 21.7 |
| | Micro Talc AT1 | 14.7 |
| | Bayferrox 130M | 5.3 |
| | Benzyl alcohol | 23.1 |
| | Total | 100.0 |
| Curing component B | Epikure 3155 | 24.7 |

For the preparation of the coating system, all of the constituents of component A were mixed and homogenized for 15 minutes in a polyethylene beaker under the action of a dissolver of type Dispermat MG-E7 from VMA-Getzmann GmbH, 51580 Reichshof, at 5000 rpm. The homogenized mixture was subsequently transferred to a new plastic beaker and again homogenized for 5 minutes under the action of the dissolver. It was subsequently transferred to a sealable metal canister.

In all of the comparative examples (2 and 3) and in all of the inventive examples 1-5, the adhesion promoter was used in a dose of 1.0% by weight of active substance (based on the total weight of component A). For this purpose, the adhesion promoter was mixed with the curing agent used (component B) and immediately thereafter was mixed with component A and homogenized for 3 minutes at 2000 rpm using a dissolver of type Dispermat LC3 from VMA-Getzmann GmbH, 51580

Reichshof. Thereafter, the coating system was left to stand for 5 minutes and then filtered through an 80µ sieve. The coating system was immediately applied to the cleaned test panel, using a 175 µm wire doctor.

The panels were dried at room temperature for 16 hours and then at 45° C. for 8 hours.

Figure 1:
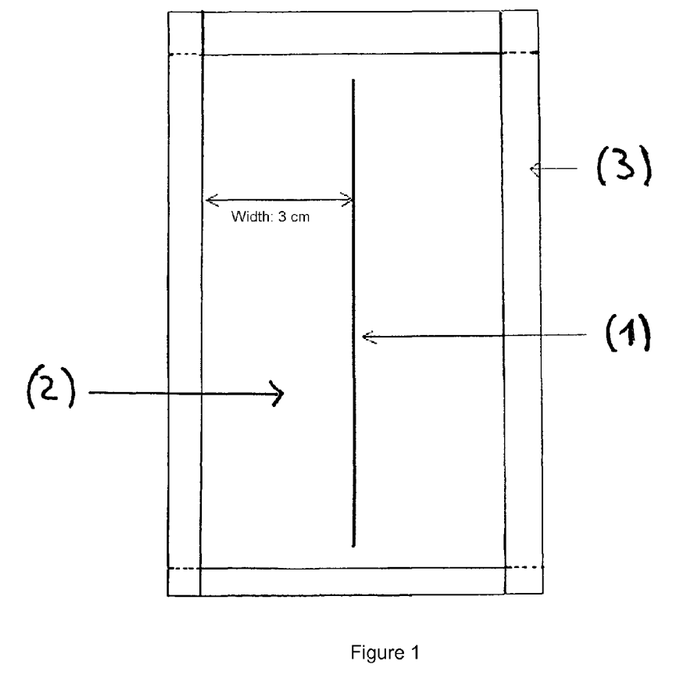
FIG. 1 illustrates a salt spray test of a coated test panel.

After drying had taken place, the dry film thickness was ascertained by means of a byko-test 1500 manual testing instrument from BYK-Gardner, 82538 Geretsried.

c) Salt Spray Test:

For the implementation of the salt spray test, a Sikkens model 463 scorer from Erichsen, 58675 Hemer (blade width: 1 mm) was used to make a score mark (1) with a width of 1 mm vertically into the center of the metal panel (2), which is fastened using adhesive strips (3), in accordance with FIG. 1.

The salt spray test was carried out in each case for 168 hours (1 week) in accordance with DIN EN ISO 9227.

For the evaluation of the salt spray test, viz of the protective effect of the applied coating material, the scribe creep was determined after 168 hours as follows:

The scribe creep is calculated on the basis of the $W_d$ value in accordance with the following formula:

$$W_d (mm) = \frac{\text{average scribe creep (mm) at 6 different locations} - 1}{2}$$

Results of the Salt Spray Test after 7 Days:

| Adhesion promoter | Dry film thickness [µm] | $W_d$ [mm] | Example No. |
|---|---|---|---|
| — | 87.0 | 72.5 | Comparative 1 |
| Trimethoxy(3-glycidyloxypropyl)silane | 86.0 | 18.0 | Comparative 2 |
| N-(3-(Trimethoxysilyl)-propyl)ethylenediamine | 84.0 | 24.0 | Comparative 3 |
| Adhesion promoter 1 | 87.0 | 10.5 | Example 1 |
| Adhesion promoter 2 | 86.0 | 9.5 | Example 2 |
| Adhesion promoter 3 | 84.0 | 8.0 | Example 3 |
| Adhesion promoter 4 | 86.0 | 9.7 | Example 4 |
| Adhesion promoter 5 | 88.0 | 6.2 | Example 5 |

The above results of the salt spray test demonstrate significantly reduced $W_d$ values when using the inventive adhesion promoters and hence a significantly enhanced coating adhesion in conjunction with reduced corrosion.

B) Use in a Polyester Baking Varnish a) Substrate

The substrate used was an electrolytically galvanized steel, sample panels from Krüppel, 47807 Krefeld, type "Zinkor DC01+ZE (25/25)"; dimensions (height/width/thickness): 150 mm×80 mm×0.8 mm.

b) Varnish System: Polyester/Melamine System

Applied to the metal test panel was a two-coat varnish consisting of primer varnish, which was applied directly to the metal surface, and a topcoat varnish in each case. The adhesion promoter was added only to the primer varnish. This was done by selecting in each case a dose of 1% by weight of the active substance (based on the total mass of the primer varnish).

Both varnish systems were each initially stirred by hand, using a spatula, and then homogenized by means of a dissolver (Pendraulik type TD100, Pendraulik, Springe, 3 minutes at 1865 rpm).

Composition of the Primer Varnish System (Polyester Melamine Varnish System):

| | Fraction in % by wt. |
|---|---|
| Millbase | |
| Dynapol LH 820 | 32.3 |
| Aerosil R972 | 0.6 |
| Blanc fixe micro | 9.1 |
| Titandioxid R960 | 9.1 |
| Let-down material | |
| Dynapol LH 820 | 21.5 |
| BYK-358 N | 1.1 |
| BYK-057 | 0.6 |
| Cymel 303 | 7.5 |
| 1-Methoxy-2-propyl acetate | 11.3 |
| Dynapol Catalyst BL 1203 | 3.8 |
| Viscosity adjustment | |
| 1-methoxy-2-propyl acetate | 3.1 |
| | 100.0 |

Dispersing Conditions:

20 minutes at 40° C. and 8000 rpm (dissolver: Pendraulik type TD100, Pendraulik, Springe), weight ratio glass beads: millbase=1:1 (glass beads: Sil-glass slg/10-12, Siltrade, Rietschen)

Composition of the Topcoat Varnish System (Polyester Melamine Varnish System):

| | Fraction in % by wt. |
|---|---|
| Millbase | |
| Dynapol LH 830 (60%) | 33.0 |
| 1-Methoxy-2-propyl acetate | 5.0 |
| Disperbyk-110 | 1.2 |
| Aerosil R972 | 0.3 |
| Titandioxid R960 | 30.0 |
| Let-down material | |
| Dynapol LH 830 (60%) | 17.0 |
| Cymel 303 | 7.5 |
| Dynapol Catalyst BL 1203 | 3.8 |
| BYK-057 | 0.2 |
| BYK-358 N | 0.5 |
| Solvesso 150 ND | 1.5 |
| | 100.0 |

Dispersing Conditions:

20 minutes at 40° C. and 8000 rpm (dissolver: Pendraulik type TD100, Pendraulik, Springe), weight ratio glass beads: millbase=1:1 (glass beads: Sil-glass slg/10-12, Siltrade, Rietschen)

Primer varnish system and topcoat varnish system were each stored at room temperature for 16 hours and then coated on under the following conditions:

Primer Varnish System:

Wire doctor: 30 µm wet film thickness

Dry film thickness: 5 µm (determined using a QuaNix 7500 film-thickness measuring instrument from Automation Dr. Nix, Cologne)

Topcoat Varnish System:

Wire doctor: 80 µm wet film thickness

Dry film thickness: 20 µm (determined using a QuaNix 7500 film-thickness measuring instrument from Automation Dr. Nix, Cologne)

Baking Conditions:

Both varnish films were each baked for 30 seconds at a temperature of 420° C. For both coats the peak metal temperature (PMT) was 232° C.

Salt Spray Test:

The varnish test panels were subjected to a 500-hour salt spray test in accordance with DIN EN ISO 9227.

For this purpose, first of all a scratch track measuring 1 mm wide and 100 mm long was scored into the varnished panels using a Sikkens scorer, model 463 from Erichsen, 58675 Hemer (blade width: 1 mm); care was taken to ensure that this scratch track is made down to the steel (in other words through the galvanizing layer). Following storage in the salt spray chamber, the extent of the scribe creep after scratching with a blade on the surface was inspected. The calculation of the $W_d$ value for ascertaining the protective effect of the two-coat varnish was made in accordance with the formula indicated above.

| Adhesion promoter | $W_d$ [mm] | Example No. |
| --- | --- | --- |
| — | 5.7 | Comparative 4 |
| N-(3-(Trimethoxysilyl)-propyl)ethylenediamine | 4.3 | Comparative 5 |
| Adhesion promoter 13 | 4.0 | Comparative 6 |
| Adhesion promoter 6 | 2.4 | Example 6 |
| Adhesion promoter 7 | 1.6 | Example 7 |

The results demonstrate the improved adhesion promoter effect through use of the inventive adhesion promoters.

C) Use in a Wood Varnish a) Substrate

The substrate used was the surface of a teak panel (solid, dimensions: 15.5 cm×7.0 cm×0.8 cm), sanded with Wetordry P220 abrasive sheet from 3M.

b) Varnish System: Polyester Acrylate

| Raw material | Weight fraction in % |
| --- | --- |
| Laromer PE 56 F | 72.65 |
| Dipropylene glycol diacrylate | 23.50 |
| Irgacure 500 | 3.85 |

The components of the varnish system as listed above were homogenized at 1865 rpm for 3 minutes using a dissolver (Pendraulik LM34, Pendraulik, Springe). When an adhesion promoter was used, it was used at a dose of 2% by weight of active substance (based on the total mass of the varnish formulation).

The varnish systems were stored overnight and then applied using a 25 μm wire doctor to the sanded teak surface.

A two-coat varnish finish was implemented, with the same varnish system being applied twice. The adhesion promoter was used only in the primer varnish system. The topcoat varnish did not contain the adhesion promoter.

Application of the primer varnish film was followed by UV curing on an M-35-2×1-TR-SS unit from IST METZ, using UV lamps of type M350 U1//M350 U1A (mercury lamp and gallium lamp, respectively, UV range: 180-450 nm) at 120 W/cm and 20 m/min travel speed (incipient gelling).

Application of the topcoat varnish film was followed by UV curing on an M-35-2×1-TR-SS unit from IST METZ, using UV lamps of type M350 U1//M350 U1A (mercury lamp and gallium lamp, respectively, UV range: 180-450 nm) at 120 W/cm and 5 m/min travel speed.

c) Measurement of the Varnish Adhesion

The varnish adhesion on the wood surface was evaluated by 2 methods:

c1) Coin Test

A 2 euro coin was used to carry out a scratch test on the varnish. Here a determination was made of the extent to which the varnish is detached from the substrate by scratching. Evaluation took place visually on the basis of school grades (1=very good adhesion, 5=no adhesion whatsoever).

c2) Crosshatch Test

Figure 2:
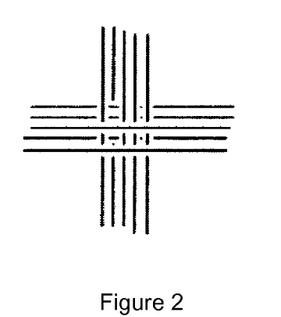
FIG. 2 illustrates a scratch test of a coated test panel.

With the aid of a folding rule, a cutter blade (NT cutter, model eA-300, NT Incorporated, Osaka, Japan) was used to apply two scratch tracks, made one after another and at rightangles to one another, each with 5 scratch lines (in accordance with FIG. 2), on the varnish. This was followed by the implementation of a 180° peel test using commercial Tesa film (Tesa SE). Evaluation took place visually on the basis of school grades (1=very good adhesion, 5=no adhesion whatsoever).

| Adhesion promoter | Coin test evaluation | Crosshatch test evaluation | Example No. |
| --- | --- | --- | --- |
| — | 5 | 5 | Comparative 7 |
| 3-Aminopropyltriethoxysilane | 4 | 5 | Comparative 8 |
| Adhesion promoter 12 | 5 | 5 | Comparative 9 |
| Adhesion promoter 8 | 2 | 2-3 | Example 8 |
| Adhesion promoter 9 | 2-3 | 2 | Example 9 |

The invention claimed is:

1. A method of promoting the adhesion between a coating comprising at least one synthetic, semisynthetic or natural polymer and a substrate surface coated therewith, wherein a separately formed adhesion promoter is either added to the coating or applied to the substrate surface before the coating is applied, said adhesion promoter being formed of a.) at least one optionally oligomeric addition product containing no terminal C=C double bonds
of at least one aminosilane and/or thiosilane containing at least one hydrolyzable silane group
and at least one further monoamine and/or polyamine having at least two amino groups, the monoamine and/or polyamine comprising no hydrolyzable silane group and containing at least one primary or secondary amino group,
with at least one compound containing at least two terminal, ethylenically unsaturated double bonds;

and/or of b.) at least one optionally oligomeric addition product containing no terminal C=C double bonds
of at least one isocyanatosilane and/or epoxy silane containing at least one hydrolyzable silane group
with at least one compound containing at least one terminal hydroxyl group and at least one terminal, ethylenically unsaturated double bond,
in combination with at least one monoamine and/or polyamine having at least two amino groups, the monoamine and/or polyamine comprising no hydrolyzable silane group and containing at least one primary or secondary amino group, said adhesion promoter being added to said coating or applied to said surface before applying the coating in an amount of less than 5% by weight, based on the total weight of the coating.

2. The method of claim 1, wherein the compounds containing terminal double bonds that are used for preparing the addition product a) contain (meth)acrylate groups as double bonds, and the compounds used for preparing the addition product b) contain, in addition to the at least one terminal hydroxyl group at least one acrylate or methacrylate group as terminal double bond.

3. The method of claim 1, wherein each of the addition products a) and b) derive from at least one oligomeric addition component by reaction with the silane component.

4. The method of claim 1, wherein the polyfunctional compounds reacting with the silane component for preparing the addition products a) and/or b) derive from saturated polyester polyethers, saturated polyesteramides, polyamides, saturated polyesters and/or polyethers containing correspondingly functional end groups.

5. The method of claim 4, wherein the polyether, polyester or polyester polyether component employed contains at least two ethylenically unsaturated double bonds as end groups or at least one terminal, ethylenically unsaturated double bond and at least one terminal hydroxyl group.

6. The method of claim 4, wherein said polyethers is or are at least one polyether selected from the group consisting of polyethylene oxides, polypropylene oxides, mixtures thereof, copolymers thereof, block copolymers thereof, and polyether condensation products of bisphenols with epichlorohydrin, and said polyesters is or are at least one polyester selected from the group consisting of polyesters of diols and saturated dicarboxylic acids, polyesters formed from lactones and polycarbonates.

7. Method of claim 1, wherein the compound containing at least one hydrolyzable silane group is a compound of the formula in which A is an epoxide group, a glycidyloxy group, an isocyanate group, an —SH group or a group —N(H)—X, where X is hydrogen, an optionally branched alkyl radical having 1 to 12 C atoms, an aryl radical having 6 to 10 C atoms or a cycloalkyl radical having 4 to 6 C atoms and each of these X radicals may be substituted by one or more primary or secondary amino group, or A is an —NH group if m is an integer 2, $R_0$ is an optionally branched alkylene radical having 1 to 12 C atoms, a cycloalkylene radical having 4 to 6 C atoms or an arylene radical having 6 to 10 C atoms, $R_1$, identical to or different from $R_2$ and $R_3$, is an optionally branched alkyl radical having 1 to 7 C atoms, a halogen, a group —O—C(=O)—$R_4$ or a group —O$R_4$, where $R_4$, identical or different, is hydrogen, a methoxyethyl group or an optionally branched alkyl radical having 1 to 7 C atoms, or a cycloalkyl radical having 4 to 6 C atoms, $R_2$, identical to or different from $R_1$ and $R_3$, is an optionally branched alkyl radical having 1 to 7 C atoms, a group —O—C(=O)—$R_4$, a halogen or a group —O$R_4$, where $R_4$, identical or different, is hydrogen, a methoxyethyl group or an optionally branched alkyl radical having 1 to 7 C atoms or a cycloalkyl radical having 4 to 6 C atoms, $R_3$, identical to or different from $R_1$ and $R_2$, is a group —O—C(=O)—$R_4$, a halogen or a group —O$R_4$, where $R_4$, identical or different, is hydrogen, a methoxyethyl group or an optionally branched alkyl radical having 1 to 7 C atoms, or a cycloalkyl radical having 4 to 6 C atoms, and m is an integer 1 or 2.

8. The method of claim 1, wherein the addition product a) is prepared using a combination of an aminosilane and at least one polyamine having at least two amino groups, the polyamine having at least one primary amino group and at least one secondary or a further primary amino group.

9. The method of claim 1, wherein the coating material comprises at least one component which is at least partly reacted with at least one functional group of the addition product a) and/or b) present as adhesion promoter, during the production of the coating, said at least one component being selected from the group consisting of polyurethane, saturated polyester, polyamide, polyolefin, polyvinyl chloride, polystyrene, polycarbonate, poly(meth)acrylate, acrylonitrile-butadiene-styrene copolymer, unsaturated polyester, epoxy resin, phenol-formaldehyde resin, melamine resin, phenolic resin, silicone resin, polylactide, cellulose ether, cellulose ester and mixtures of at least two of said polymers.

10. The method of claim 1, wherein the adhesion promoter is applied as at least one component in a preliminary coating on the substrate surface, and the coating is present in the form of a surface-coating film which is based on a cured binder system whose functional groups are at least partly reacted with those of the adhesion promoter a) and/or b) during the production of the surface-coating film.

11. The method of claim 10, wherein the binder system to be cured is based on i. a curable binder system comprising at least one compound containing at least epoxide end groups, and at least one curing component, ii. a curable binder system comprising compounds containing alkoxysilane groups or silanol groups, iii. a curable binder system comprising at least difunctional polymers containing carboxylic acid groups and at least one compound which contains at least two epoxy groups or at least two OH groups per molecule, iv. a curable binder system comprising at least one polyacrylate- or polyester/melamine-based binder, v. a radiation-curable binder system comprising a polymer containing at least two ethylenically unsaturated groups, and optionally at least one reactive diluent copolymerizable with these functional groups, vi. a curable binder system comprising at least one at least difunctional polyesteramide and/or polyamideimide-based binder, vii. a curable binder system comprising at least one at least difunctional isocyanate compound whose isocyanate groups are optionally in blocked form, and at least one at least difunctional isocyanate-reactive component, viii. a curable binder system comprising at least one polymer containing at least two epoxide end groups, and a phenolic resin and/or ix. a curable binder system comprising at least one amino resin.

12. The method of claim 1, wherein the substrate surface is an optionally pretreated and/or precleaned and/or passivated metal surface or metal alloy surface, a plastics surface, a glass surface, a surface of a cellulose material, an optionally pretreated wood surface or the surface of an existing, optionally spent or weathered coating.

13. The method of claim 1, wherein the substrate surface has a sheetlike extent.

* * * * *